US009043465B2

(12) United States Patent
O'Connell (10) Patent No.: US 9,043,465 B2
(45) Date of Patent: May 26, 2015

(54) METHOD OF PROVIDING SERVICES IN A NETWORK, NETWORK ELEMENT AND COMPUTER PROGRAM PRODUCT (75) Inventor: John O'Connell, Grenoble Cedex (FR)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1438 days.

(21) Appl. No.: 12/373,119

(22) PCT Filed: Jul. 10, 2007

(86) PCT No.: PCT/EP2007/057063
§ 371 (c)(1),
(2), (4) Date: Jan. 9, 2009

(87) PCT Pub. No.: WO2008/006837
PCT Pub. Date: Jan. 17, 2008

(65) Prior Publication Data
US 2009/0210534 A1    Aug. 20, 2009

(30) Foreign Application Priority Data

Jul. 12, 2006    (EP) .................................... 06300801

(51) Int. Cl.
*G06F 15/173*    (2006.01)
*H04L 29/08*    (2006.01)
(52) U.S. Cl.
CPC ................ *H04L 67/14* (2013.01); *H04L 67/28* (2013.01); *H04L 67/2838* (2013.01)
(58) Field of Classification Search
USPC ................................................ 709/223–226
See application file for complete search history.

(56) References Cited

U.S. PATENT DOCUMENTS

2004/0060054 A1    3/2004    Das et al.

FOREIGN PATENT DOCUMENTS

WO    03017055 A2    2/2003

OTHER PUBLICATIONS ("The NEMO P2P Service Orchestration Framework"; Bradley, William B.; Maher, David P.; Prodeedings of the 37th Hawaii Interantional Conference on System Sciences 2004; IEEE 2004).*

(Continued)

*Primary Examiner* — Afshawn Towfight
(74) *Attorney, Agent, or Firm* — Trop, Pruner & Hu (57) ABSTRACT

The invention focuses on providing services (3) originating from a plurality of services (3a, 3b) through one central network element (4), which may be integrated in a gateway. The network element performs a method comprising:—combining pluralities of independent service elements (3a, 3b) to form respective service compositions;—providing a plurality of service chaining applications, each of said service chaining applications being associated with one of said service compositions and defining a set of network and/or user events associated with actions for controlling the independent service elements (3a, 3b) of the corresponding service composition; wherein upon triggering of at least one service composition said method further comprises:—identifying and executing a corresponding service chaining application to manage instances of the independent service elements (3a, 3b) comprised in said service composition in accordance with current network and/or user events; and—managing said network resources and said network services in accordance with a totality of current instances of independent service elements (3a, 3b).

20 Claims, 3 Drawing Sheets (56) References Cited

OTHER PUBLICATIONS

Bradley, W B et al: "The NEMO P2P Service Orchestration Framework", System Sciences, 2004. Proceedings of the 37th Annual Hawaii International Converence on Jan. 5-8, 2004, Piscataway, NJ, USA, IEEE, Jan. 5, 2004, pp. 290-299, XP010682888.

Nishiyama, N et al: "Composing User Network Operation Services Using Web Service Composition Techniques", Consumer Communications and Networking Conference, 2005. CCNC. 2005 Second IEEE Las Vegas, NV, USA Jan. 3-6, 2005, pp. 139-143, XP010787625.

PCT International Search Report and PCT Written Opinion of the International Searching Authority in co-pending PCT International Application No. PCT/EP2007-057063, International Filing Date of Jul. 10, 2007 and entitled "Method of Providing Services in a Network, Network Element" having a date of mailing Sep. 7, 2007.

PCT International Preliminary Report on Patentability and Written Opinion in co-pending PCT International Application No. PCT/EP2007/057063, International Filing Date of Jul. 10, 2007 and entitled "Method of Providing Services in a Network, Network Element" having a date of mailing of Jan. 13, 2009.

* cited by examiner

METHOD OF PROVIDING SERVICES IN A NETWORK, NETWORK ELEMENT AND COMPUTER PROGRAM PRODUCT

CROSS-REFERENCE TO RELATED APPLICATIONS

The present application is filed under 35 USC §371 and claims the benefit of International Patent Application No. PCT/EP2007/057063 entitled "METHOD OF PROVIDING SERVICES IN A NETWORK, NETWORK ELEMENT AND COMPUTER PROGRAM PRODUCT", with an International filing date of Jul. 10, 2007 and which claims the benefit of European Patent Application No. EP06300801.5 entitled "METHOD OF PROVIDING SERVICES IN A NETWORK, NETWORK ELEMENT AND COMPUTER PROGRAM PRODUCT" and filed on Jul. 12, 2006.

BACKGROUND OF THE INVENTION

The present invention relates to a method of providing services in a network offering a plurality of independent service elements.

The present invention also relates to a network element for use as a gateway in a network, and to a computer program product comprising program code sequences operable to implement a network gateway function.

Next-generation communication services will be composed of multiple individual services or service elements. Each service element will typically be responsible for a specific interaction mode (e.g., audio communication) or content type (e.g., delivering location information to a user). Richer user experience will be created by combining a number of individual services to support multi-modal scenarios, thus forming service compositions. In such scenarios, coordination of interaction with the user, managing of used network resources and customization of service behaviour will be important issues.

With the upcoming evolution to 3G ($3^{rd}$ Generation) and broadband networks, users expect to be able to communicate more easily and to share data in the form of photos, images, audio files, personal contents, etc. in real-time with other users in the network. In this new network environment, content providers want to be able to deliver richer media to customers by combining voice, video, images, text, etc. from multiple choice sources within a single session. In this context, many different combinations of media types and delivery channels can be envisaged. Higher-level programming environments can be devised to allow rapid customization of offered services. For example, an enterprise customer or content provider may define specific service offerings or service features for their target users, i.e., enterprise employees or content consumers.

Prior art approaches to service composition in the field of telecommunications have generally taken a network-centric approach. In 2G or TDM (time division multiplex) networks, feature interaction (i.e., being able to invoke multiple advanced features, and being able to detect conflicts between those features, within a single voice call, such as prepaid billing and number translation) has been widely used. With the evolution to SIP (session initiation protocol)-based networks, a new concept called SCIM (service capability interaction manager) has been introduced to tackle the issue of how to invoke multiple SIP-based applications within a single SIP session. Again, the SCIM model has approached the problem of service composition from the point of view of a network session, and is primarily concerned with detecting and managing conflicts between different network applications. In this way, SCIM does not support building composed services by external entities.

In the Internet world, where services are primarily delivered to a personal computer (PC) client, the issue of service composition has been avoided to a large extent. When multiple services want to interact with the user, they typically do so in parallel, with each service allocating its own resources and creating its own window on the PC screen. Service priority is decided on by the PC operating system (or the user, via a mouse click). However, this approach is of limited use only since it does not work in the context of telecommunications, as typical user devices are less powerful and the access networks used for accessing the network are limited in capacity.

OBJECT OF THE INVENTION

It is an object of the present invention to provide a method, a network element, and a computer program product for implementing said network element which enables a network operator to manage user experience and to ensure optimal use of network resources, while providing entities with the flexibility to offer customized, rich media services in the form of service compositions.

SUMMARY OF THE INVENTION

According to a first aspect of the present invention the object is achieved by providing a method of providing services in a network offering a plurality of independent service elements in the form of network resources and network services, said method comprising:
  combining pluralities of said independent service elements to form respective service compositions;
  providing a plurality of service chaining applications, each of said service chaining applications being associated with one of said service compositions and defining a set of network and/or user events associated with actions for controlling the independent service elements of the corresponding service composition;
wherein upon triggering of at least one service composition said method further comprises:
  identifying and executing a corresponding service chaining application to manage instances of the independent service elements comprised in said service composition in accordance with current network and/or user events; and
  managing said network resources and said network services in accordance with a totality of current instances of independent service elements.

According to a second aspect of the present invention the object is achieved by providing a network element for use in a network as gateway between:
  a plurality of service chaining applications, each of said service chaining applications being associated with a respective service composition linking a plurality of independent service elements in the form of network resources and network services and defining a set of network and/or user events associated with actions for controlling the independent service elements of the corresponding service composition; and
  the network resources and the network services that are required to implement a service behaviour corresponding to a given service composition;
said network element comprising:
  means for detecting network and/or user events on a number of network and user channels, respectively;

means for detecting triggering of at least one service composition;

means for executing a service chaining application corresponding to said at least one service composition to manage instances of the independent service elements comprised in said service composition in accordance with current network and/or user events;

means for monitoring a totality of current instances of independent service elements; and means for managing said network resources and said network services in accordance with said totality of current instances of independent service elements.

According to a third aspect of the present invention the object is achieved by providing a computer program product comprising program code sequences operable to implement a network function serving as a gateway between:

a plurality of service chaining applications, each of said service chaining applications being associated with a respective service composition comprising a plurality of independent service elements in the form of network resources and network services and defining a set of network and/or user events associated with actions for controlling the independent service elements of the corresponding service composition; and the network resources and the network services that are required to implement a service behaviour corresponding to a given service composition;

said program code sequences further being operable to implement and/or control in said network function:

means for detecting network and/or user events on a number of network and user channels, respectively;

means for detecting triggering of at least one service composition;

means for executing a service chaining application corresponding to said at least one service composition to manage instances of the independent service elements comprised in said service composition in accordance with current network and/or user events;

means for monitoring a totality of current instances of independent service elements; and means for managing said network resources and said network services in accordance with said totality of current instances of independent service elements.

Said program code sequences can be provided in any suitable programming language available to a person skilled in the art, e.g., C, C++, Java, or the like.

In accordance with embodiments of the present invention, service compositions are defined in the form of groups of independent service elements. Each service composition requires service-specific application logic (so-called service chaining logic) to establish an appropriate level of synchronization between individual service elements.

According to embodiments of the present invention, a Service Orchestration Function (SOF) is provided which acts as a network gateway between said service chaining application logic and network resources or services within a three-tier model. The SOF is responsible for identifying and optionally downloading service chaining application logic in response to a user request or network event, executing an application logic which results in an invocation of or an interaction with individual service elements, invoking default logic in response to predefined user or network events, managing network resources and network services, and managing user interaction.

In an embodiment of the method in accordance with the present invention, the latter comprises triggering a service composition, i.e. invoking an instance of a service chaining application logic, in response to a network and/or user event.

In order to allow service customization, the service chaining application logic may be provided by external entities other than the network operator. It may be hosted externally of the network on internet or intranet servers. Correspondingly, a further embodiment of the method in accordance with the present invention comprises downloading said corresponding service chaining application from a source external of the network.

Furthermore, a given service chaining application logic may be customized for the user who requested the corresponding service, e.g., by providing a user identifier to the service chaining application logic when requesting said given service In a corresponding embodiment of the network element in accordance with the present invention the network further comprises means for downloading at least one service chaining application from a source external of the network, in particular from an internet/intranet server.

In another embodiment of the network element in accordance with the present invention the network further comprises means for at least temporarily storing or caching said service chaining applications.

In order to optimize logic programming, certain default actions such as shutting down a communication session may be pre-programmed by the network operator rather than implemented within each service chaining application. In a corresponding embodiment of the method in accordance with the present invention, said method further comprises executing predefined default logic in response to predefined user and/or network events (e.g., a charge account reaching a predefined threshold value, in which case a warning message may be displayed according to corresponding default logic).

In a related embodiment of the network element in accordance with the present invention the latter further comprises means for storing predefined applications for default network operator-specific behaviour.

In order to optimize use of network resources, policies may be defined and enforced, such that in yet another embodiment of the method in accordance with the present invention, managing network resources and network services comprises at least one of sharing network resources and/or network services across independent service elements; and freeing up network resources allocated to a first independent service element for use by a second independent service element in accordance with said policies.

While certain policies may be provided by an external entity, in another embodiment of the method in accordance with the present invention, managing network resources and network services may further comprise applying network operator-specific policies, in particular with respect to timely allocation and de-allocation of resources.

All user and/or network events are reported to the Service Orchestration Function which—as a service chaining application is being executed—is responsible for establishing and terminating channels of interaction with the user and for capturing user events on these channels. In this context and another embodiment of the method in accordance with the present invention, upon capturing a user event said method further comprises managing executing a next step in a current service chaining application;

invoking a new service chaining application; and executing a predefined default application;

ignoring said user event in case no corresponding action is defined.

In a further embodiment of the network element in accordance with the present invention the network further comprises a plurality of user interaction channels for different types of user interaction, such as via voice, WAP, messaging, or the like.

In this context and in yet another embodiment of the network element in accordance with the present invention the latter further comprises a plurality of interfaces to said network resources and said network services, in particular low-level interfaces and high-level interfaces, the latter particularly being devised as SIP, IN, XML, or CCXML control interfaces.

Advantageously, the Service Orchestration Function is designed to be independent of a level of granularity of individual network resources and services. In order to achieve this, another embodiment of the method in accordance with the present invention further comprises providing a control channel for each of said network resources and network services, each of said channels being associated with a set of events for controlling said network resources and said network services by means of said service chaining application. In this way, service chaining applications can choose an appropriate level of granularity, depending on the level of control they need over given network services and network resources that will be used to deliver a particular service to the user.

In a further embodiment of the network element in accordance with the present invention a service behaviour is customized on a per-user or on per-service basis, thus providing increased flexibility with respect to providing service compositions.

As can be gathered from the above-described embodiments in accordance with the present invention, the network element (Service Orchestration Function) is devised to operate in both multi-network and multi-modal fashion. It offers a generic programmable interface to the service chaining application logic that is independent of any specific type of user interaction, network resource or application.

In another embodiment of the network element in accordance with the present invention the service chaining applications are provided in a script language, in particular in XML or CCXML script language, and wherein said service chaining application executing means are devised as a corresponding script language execution engine.

Further advantages and characteristics of the present invention can be gathered from the following description of preferred embodiments given by way of example only with reference to the enclosed drawings. Features mentioned above as well as below can be used in accordance with the present invention either individually or in conjunction. The described embodiments are not to be regarded as an exhaustive innovation but rather as examples of a basic concept underlying the present invention.

DETAILED DESCRIPTION

Figure 1:
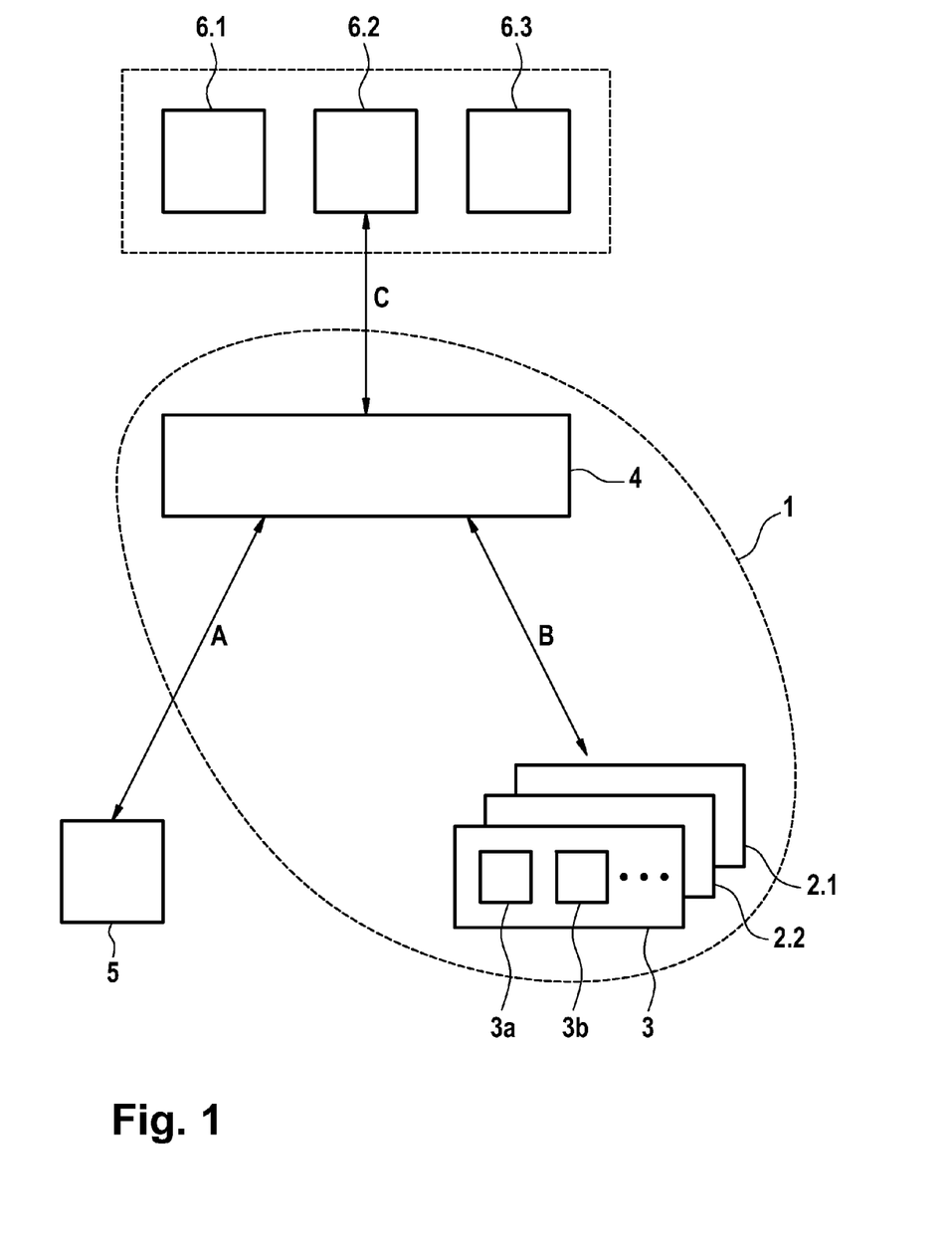
FIG. 1 is a schematic diagram illustrating a three-tier model for service chaining in accordance with embodiments of the present invention.

FIG. 1 shows a schematic diagram of the three-tier model for service chaining as used in embodiments of the present invention. FIG. 1 comprises a functional representation of a network 1, i.e., a communication network comprising a plurality of operatively connected and interacting computers (not shown in FIG. 1), as known to a person skilled in the art.

Generally, network 1 comprises, i.e., is adapted to provide a plurality of network resources 2.1, 2.2 and network services 3, only a few of which are depicted for reasons of clarity. In the present document, network resources and network services such as 2.1, 2.2 and 3 will also be referred to as independent service elements. As further depicted in FIG. 1, network resources 2.1, 2.2 and network services 3 generally offer different levels of granularity. In the following, network resources 2.1, 2.2 will be regarded as independent service elements that allow a management of individual resources (e.g., management of a single voice channel) while network services will be regarded as independent service elements which comprise embedded resources, as denoted in exemplary fashion means of reference numerals 3a, 3b in FIG. 1.

As known to a person skilled in the art, network resources 2.1, 2.2 and network services 3 are provided by means of suitably configured computers (not shown) within network 1.

Practical examples for network resources 2.1, 2.2 and network services 3 are—without limitation—a network-based address-book function, a communication service function, a chat function, a media streaming function, or the like.

As further depicted in FIG. 1, network 1 further comprises a network element 4, hereinafter also referred to as Service Orchestration Function (SOF), the functioning of which will become apparent later. An exemplary architecture of SOF 4 will be described below with reference to FIG. 2.

SOF 4 is operatively connected with network resources 2.1 and 2.2 and network service 3 for allocation and de-allocation of resources, service invocation and termination and for receiving signals corresponding to network events, as symbolized by means of double-headed arrow A in FIG. 1.

FIG. 1 further shows a user device 5 in operative connection with network 1 via SOF 4. In accordance with the embodiments of the present invention, user device 5 can be a personal computer (PC), a handheld computing device, a mobile phone, or the like. User device 5 is attached to network 1, i.e., SOF 4, through multiple channels, e.g., voice, WAP, messaging, or the like. Via said channels, SOF 4 is enabled to receive user requests and user interaction events and to provide requested services for user device 5, as is illustrated by means of doubled-headed arrow B.

As further depicted in FIG. 1, the three-tier model for service chaining also comprises a plurality of service chaining applications 6.1, 6.2, 6.3 also referred to as service chaining application logic. According to the embodiments of FIG. 1, service chaining applications 6.1, 6.2, 6.3 are not comprised within network 1 but are hosted externally of network 1 on intranet/internet servers (not shown in FIG. 1). However, alternatively or additionally, service chaining applications could also be hosted within network 1, e.g., within SOF 4, as will become apparent later.

Service chaining application logic is a service-specific logic which enables establishing an appropriate level of synchronization between individual independent service elements, i.e., individual network services and resources, to provide a seamless composition of services (i.e., switching from one service to another) to an end-user, i.e., user device 5. In an embodiment of the present invention, said service chaining application logic is written in a scripting language such as XML, CCXML, or the like. Service chaining application logic may be stored on a web server with an associated URL address.

A service chaining application logic is structured as a set of events (user events and/or network events) and associated transitions or actions. In other words, when an event occurs, the service chaining application logic defines what action is to be taken with respect to controlling network resources and services in terms of resource allocation and de-allocation, service invocation and termination by means of SOF 4, as already stated above.

As also depicted in FIG. 1, SOF 4 is adapted for interaction with service chaining application logic 6.1-6.3 in view of application logic discovery and download, as illustrated by means of double-headed arrow C. This aspect will also be described in more detail further below.

As already stated above, each service chaining application logic 6.1-6.3 is associated with a specific service composition scenario such that multiple service chaining applications will exist, each one offering its unique combination of network services (i.e., its own unique user experience). The primary goal of service compositions is to create more advanced applications and to support richer user scenarios, without the need to implement every single one of such scenarios from scratch. In contrast to this, the present embodiments are concerned with creating richer user scenarios and providing the corresponding services while reusing existing service elements, i.e., the above-mentioned independent service elements 2.1, 2.2, 3 of network 1. The number of possible combinations for service composition is essentially limitless. Simple examples of telecom service compositions include—without limitation—using a network contact list (address book function) to trigger a group conference call, sharing personal content (stored on user device 5) during a voice call, or retrieving location information from the network and sharing it with participants of a conference call.

In all these cases, a user could choose to access each service individually. However, user experience is enhanced if the composition of the service, i.e., a combined service composed of a plurality of individual service elements, is seamless to the user. In other words, there is, for instance, no need to re-enter destination phone numbers or to explicitly copy/paste content from one service to another.

As already briefly mentioned above, some service compositions and the corresponding service chaining application logic will be implemented and deployed by an operator of network 1 (FIG. 1). Preferably, said service chaining applications will be hosted within network 1, e.g., within SOF 4. However, much of the potential benefit of service composition is achieved when external entities other than the network operator (e.g., enterprise customers or content providers) are able to offer customized services on a per-user, per-service, or per-network basis. For example, an enterprise customer may offer communication services that are based on an enterprise address book rather than on a network address book. A content provider may offer live chat sessions between customers who are listening to or watching the same media content (e.g., listening to the same live concert, or watching the same video cast). Each of said scenarios again requires service-specific application logic (service chaining logic), which would then be hosted externally on intranet/internet servers, as already stated above.

In this way, the service chaining application logic constitutes the link between network-independent service elements forming a service composition. It has two main responsibilities: In the first place a service chaining application logic is configured to identify, initiate and control all instances of the independent service elements within network 1, e.g., network resources 2.1 and 2.2 and network services 3. That is, in response to a user request or a network event (cf. arrows A, B in FIG. 1), or as an automatic action, the service chaining application logic can trigger a new instance of a service, modify an already established service instance, or terminate a service instance, when executed by means of SOF 4 as will be described in detail later.

A second main responsibility of service chaining application logic consists in maintaining state information that needs to be shared or transferred between the individual independent service elements comprised in a service composition. Independent service elements generally do not communicate directly with each other. As such, they are unaware of each other's existence to a large extent.

As has already been mentioned briefly in the above description, in the three-tier model of FIG. 1 the Service Orchestration Function (SOF 4) acts as a gateway between the service chaining application logic (upper tier) and the network resources/services (lower tier) that are required to implement the service behaviour a given service chaining applications aims to provide. In this way, SOF 4 forms the middle or intermediate tier within the three-tier model of FIG. 1.

As the intermediate tier, the SOF 4 is thus able to centrally manage the network resources required by each service chaining application and to optimise the use of those network resources when the resources are shared by multiple networks. The SOF 4 can also be used for imposing any default logic (e.g. operator policies) that may be used to override any service chaining application logic, as described in further detail below. An architecture of the Service Orchestration Function in accordance with an embodiment of the present invention and its corresponding functioning will now be described in detail with reference to FIG. 2.

Figure 2:
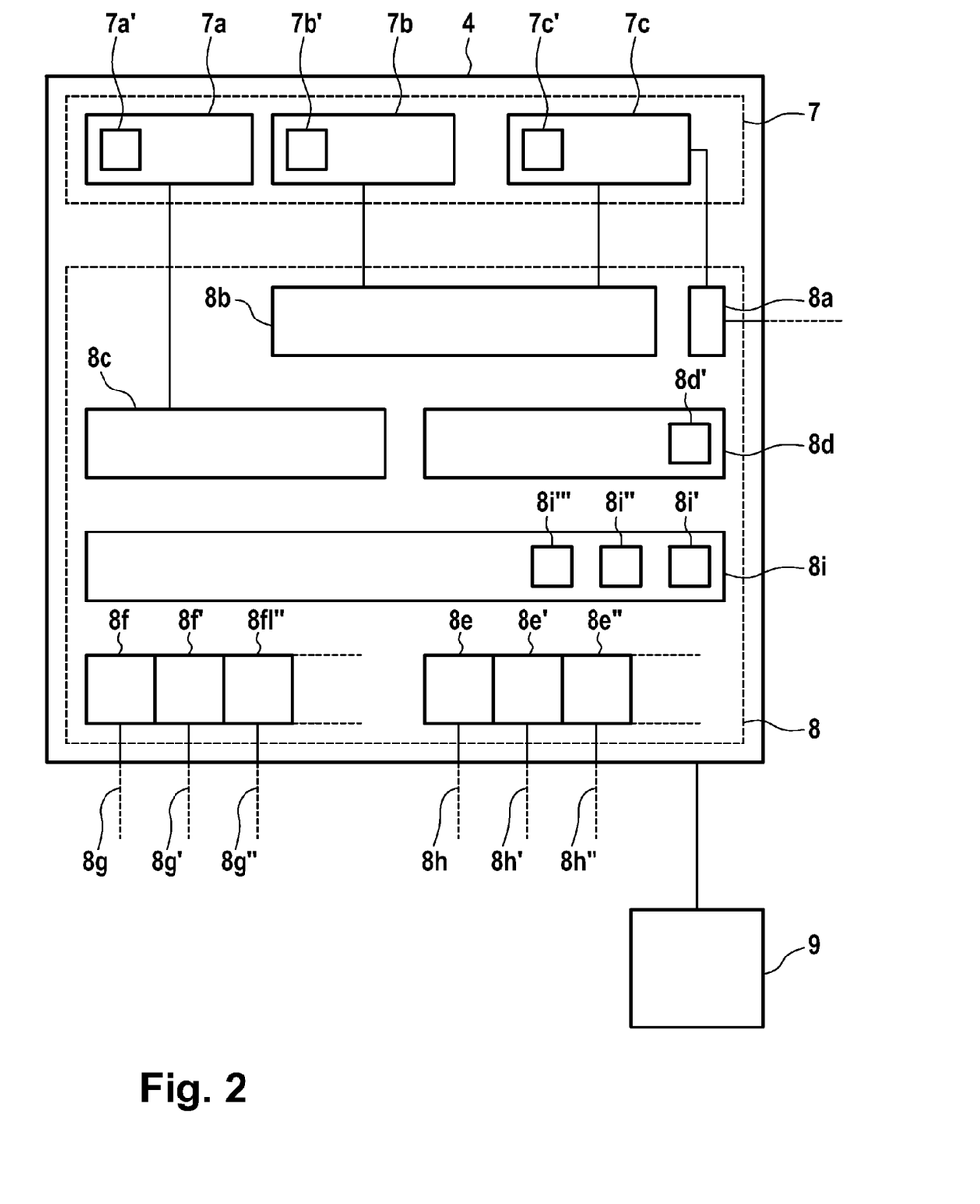
FIG. 2 is a schematic block diagram of an embodiment of the network element in accordance with the present invention.

FIG. 2 is a schematic block diagram of the network gateway element, i.e., SOF 4 of FIG. 1. According to the embodiment of FIG. 2, SOF 4 generally comprises a conventional data storing means and data processing means, respectively, as known to a person skilled in the art. In FIG. 2, said storing means are represented in a general way by means of dashed box 7, and said data processing means are represented by dashed box 8.

As can further be gathered from FIG. 2, within storage means 7 the SOF 4 comprises means 7a for storing policy definitions 7a', means 7b for storing predefined applications 7b', and means 7c for at least temporarily storing (caching) service chaining applications 7c'.

Within data processing means 8 the SOF 4 comprises means 8a for downloading service chaining application logic from an external source, in particular an internet/intranet server, as described above in connection with FIG. 1. As further depicted in FIG. 2, downloading means 8a is operatively connected with storing means 7c. Within data processing means 8, SOF 4 further comprises an execution engine 8b for executing service chaining application logic. Since service chaining application logic can be written in a scripting language execution engine 8b should accordingly be devised as a scripting language execution engine. As can be gathered from FIG. 2, execution engine 8b is in operative connection with storing means 7b, 7c for execution of respective applications stored/cached in said storing means 7b, 7c.

Furthermore, within data processing means SOF 4 comprises policy enforcement means 8c in operative connection with policy definition storing means 7a, and means 8d for managing network resources 2.1, 2.2 and network services 3 within network 1 of FIG. 1. Network resource management means 8d further comprises monitoring means 8d', the functioning of which will become apparent later.

As can further be gathered from FIG. 2, within data processing means 8 the SOF 4 also comprises interfaces 8e, 8e', 8e", ... to network resources and services (FIG. 1), e.g., in form of SIP, IN, CCXML interfaces, or the like, and a plurality of interfaces 8f, 8f', 8f", ... to user interaction channels 8g, 8g', 8g" (e.g., voice, WAP, messaging, ... ). Furthermore, for each network resource or service there is provided a network control channel 8h, 8h', 8h".

Within data processing means 8, SOF 4 further comprises an event handling means 8i having means 8i' for detecting network and/or user events from said user channels 8g-8g" and on said network control channels 8h-8h". Event handling means 8i also comprises means 8i" for detecting triggering of a service composition, i.e., execution of a corresponding service chaining application, and means 8i'" for dispatching corresponding events (actions) to user device 5 (FIG. 1) and to individual service elements via said user and network channels, respectively, as will be explained in more detail below.

Furthermore, SOF 4 comprises an input device 9, e.g., a keyboard, a network interface, a reader for computer-readable media, or the like, for configuring and/or programming the SOF 4, e.g. by providing policy definitions 7a', predefined applications 7b', etc. In an embodiment of the present invention, input device 9 may be devised in the form of a standard database provisioning interface.

Each network resource, network service and user interaction channel is associated with a set of events. These are the events that can occur on that particular network resource, network service, or user channel. The service chaining application logic reacts to these events by taking an appropriate action. As such, the events are "known" to SOF 4.

Taking the example of a voice call, events that may be of interest to the service chaining application logic include the "call request" event, "call established" event, "call failed" event and "call terminated" event. A service chaining application that requests a new call (e.g., when requesting a voice call with a friend) should also react when the call is established or if the call request failed. If the call is correctly established, the service chaining application logic may react to the "call established" event by offering the user some additional capabilities, e.g., allowing the user to share a video clip or send an instant message to the other person in the call. On the other hand, if call setup failed (e.g., if the other person did not answer the call), then the service chaining application logic may react to the "call failed" event by offering the user some alternative capabilities, e.g., allowing the user to send a text message or leave a voice-mail message for that other person.

Similarly, when a voice call is finished (and when the "call terminated" event is received by the service chaining application logic), the service chaining application logic may react by presenting the user with a new menu of choices, e.g., to start a new call, to select another contact in the address book, or to send a text message to the other person who participated in the call that just terminated.

In the above example a network service ("establishing a 2-way voice call") is associated with a set of well-known events (i.e., "call request", "call established", "call failed" and "call terminated"). These events are used when defining the service chaining application logic. In this way, the latter may react to each one of these events in the appropriate way. Each network resource or service has its own set of events, where the set of events may be defined by a standard or may be proprietary or specific to that particular network resource or service. The event handling means 8i is independent of these sets of events. It is responsible for routing events to the correct instance of the service chaining application logic through dispatching means 8i'". For instance, if a service chaining application has requested a 2-way call, then the "call established", "call failed" and "call terminated" events should be routed back to that same application, for further processing.

By using the above-described components, SOF 4 identifies and optionally down-loads a service chaining application logic in response to a user request (user event) or a network event by employing detecting means 8i', 8i'", downloading means 8a and storing means 7c. Examples for user requests include—without limitation—the action of accessing a user's network address book, accessing a public content store, establishing a voice session (i.e., dialing a phone number), sending an SMS message, etc. Said network events include—without limitation—registering a new user with the network, or a prepaid account reaching some predefined threshold. All such events are reported to the Service Orchestration Function via corresponding user channels 8g-8g" or network control channels 8h-8h" to detecting means 8i', 8i'", which are responsible for identifying which service chaining application to download—if not already stored/cached within the SOF 4—and to invoke in response to a given user request/network event.

By means of execution engine 8b, SOF 4 is also responsible for executing the service chaining application logic 7c' comprised in storing means 7c, where individual application logic commands result in invocation of and/or interaction with individual service elements, i.e., network resources 2.1, 2.2 and network services 3 via dispatching means 8i'", as previously described in connection with FIG. 1.

In response to certain predefined user or network events, SOF 4 invokes and executes predefined application logic 7b' stored in storing means 7b for default operator-specific behaviour. For example, if a user chooses to shut down a current service session, a corresponding logic 7b' enabling termination of all open channels and freeing up allocated network resources may be pre-programmed (i.e., defined only once by the network operator) and stored in storing means 7b, rather than being implemented within each service chaining application.

By means of resource management means 8d having a master view of resources the SOF 4 is further operable and responsible to manage network resources and network services. In order to optimize the user network resources, SOF 4 must maintain a view on which network resources are currently being used. This can be achieved by employing monitoring means 8d' which are adapted to monitor a totality of current instances of independent service elements.

Policies 7a', as stored in corresponding storing means 7a, are defined to determine when resources can be shared across network elements, and when resources should be freed up. According to embodiments of the present invention these policies take into account the capabilities of the user device 5 (FIG. 1), the capabilities of an access network (not shown) used by user device 5 for accessing the network 1 (FIG. 1), the cost of allocating and de-allocating resources, the nature of said resources, etc. For example, storing means 7a may comprise a policy 7a' which defines that for an application requiring a voice channel from time to time, it may be appropriate to keep that channel open for the entire duration of a corresponding application session, rather than shutting down and re-establishing the voice channel every time that audio content needs to be input or output. For user devices that only support a single channel of a given type, e.g., an audio channel, SOF 4 must include suitable policies that enable acting as arbitrator if multiple independent service elements require using that particular channel. In order to address this need, resource managing means 8*d*—which, in the present example, is aware of audio channel resources—is responsible for taking requests from respective service chaining applications and for applying appropriate changes on the audio channel, i.e., one of user channels 8*g*-8*g*", via dispatching means 8*i*'" while further respecting any pertinent operator-defined policies 7*a*'.

Policies 7*a*' stored in storing means 7*a* are executed or enforced by means of policy enforcement means 8*c*.

Moreover, as already stated above, SOF 4 is responsible for managing user interaction. While some service chaining applications are triggered in response to a network event, most service chaining applications are triggered in response to a user request. As a given service chaining application logic 7*c*' is executed by means of execution engine 8*b*, SOF 4 is responsible for establishing and terminating other channels 8*g*-8*g*" of interaction with the user, and for capturing user events on those channels through event detecting means 8*i*'. Each such user event can trigger execution of subsequent application logic. In the present context this comprises execution of a next step in a service chaining application 7*c*' that is currently being executed, invocation of a new service chaining application instance, or execution of a pre-programmed default action, as explained in detail above.

It should be noted, however, that in accordance with embodiments of the present invention, execution of service logic is not limited to serial execution. For example, a simple service chaining application may consist of executing a first service logic and, in response to a suitable event, the executing a second service logic. Indeed, embodiments of the present invention enable different service logic to be executed in parallel, under management of the SOF 4. Such parallel execution enables an array of function rich service chaining applications to be provided. For example, a service chaining application may connect a plurality of subscribers in a conference call whilst enabling instant messages to be sent between one or more sub-sets of those subscribers. In this example, network resources that are required for both the conference call and the instant messaging session are managed centrally by SOF 4, in order to ensure optimal use of these resources.

As already mentioned above in connection with FIG. 1, network resources and network services can offer varying levels of granularities. Accordingly, individual network resources may offer low-level interfaces that allow management of individual resources (i.e., management of a voice channel), whereas network services with embedded resources (cf. FIG. 1) may offer higher-level interfaces. However, SOF 4 as described above is designed to be independent of said level of granularity. It simply requires that each network resource or network service expose a control channel, such as control channels 8*h*-8*h*", and that a particular set of events (control actions) associated with that channel be known to the SOF 4. Individual service chaining applications may then choose an appropriate level of granularity which depends on the level of control that is required over a particular network resource or network service in order to provide a desired service to an end-user.

As will be appreciated by a person skilled in the art, the Service Orchestration Function in accordance with the above-described embodiments, is capable of both multi-network and multi-modal behaviour. It provides a generic programmable interface to service chaining application logic that is independent of any specific type of user interaction, network resource or application. Each type of network resource, network service, and user channel is associated with a predefined (and extensible) set of events. The service chaining application logic is structured as a unique sub-set of said events and associated state transitions. That is, when an event occurs, the service chaining application logic defines what action is to be taken (in terms of controlling the network resources and/or network services)—unless some pre-programmed default logic overrides said action. Note that if no action is defined in the service chaining application logic, i.e., a given event is not included in said sub-set of events, then said event is ignored.

Owing to its multi-modal nature, the proposed approach is not limited to a specific type of communication and can be applied to many different types of session-based scenarios (e.g., voice call, content streaming, multi-user sessions (conferencing, gaming), messaging session, etc.). As stated above, the Service Orchestration Function offers a generic programmable interface (programmable, for instance, by inputting corresponding data through input device 9) that is independent of any specific user interaction mode.

Input device 9 can further be used to provide any program code sequence required to implement any of the above described means or functions of SOF 4. Furthermore, the SOF may be regarded as an extensible platform, where new interaction modes can be supported dynamically. So, when a new network service or network resource becomes available within the network, dynamically uploading or linking program code within the SOF may be envisaged to manage interaction with that new network service or network resource. Once this new function has been installed, the SOF can interact with the corresponding network service or resource, and service chaining applications can be written both to react to events coming from that service or resource and to combine that service or resource with other existing services or resources, as previously described. This re-enforces the idea that the SOF is independent of any given network service or resource, and it allows the SOF to be extended to inter-work with new types of network services and resources. For to trans-late the latter idea into practice, there should be a way of dynamically inputting new logic into the SOF in order to manage the interaction with new types of services and resources (that is, uploading program code to implement new functions (not shown) equivalent to existing functions 8*e*, 8*e*', 8*e*", . . . and 8*h*, 8*h*', 8*h*", . . . , respectively). Similarly for elements 8*f* and 8*g*, if dynamical support of new types of user interaction is to be enabled.

Figure 3:
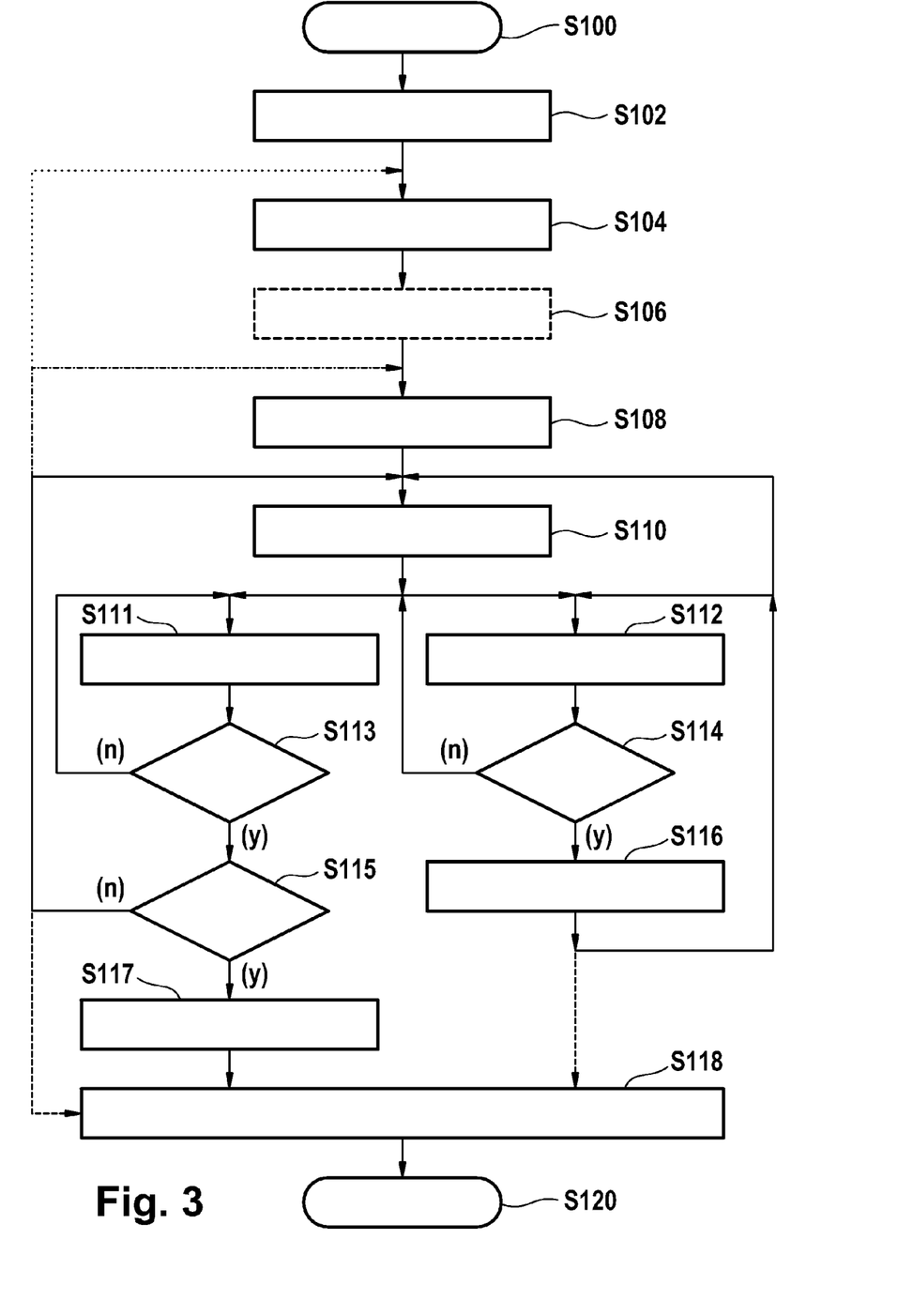
FIG. 3 is a flow chart illustrating an embodiment of the method in accordance with the present invention.

FIG. 3 shows a flow chart of an embodiment of a method in accordance with the present invention.

According to this embodiment, the method starts with step S100. In subsequent step S102 a user request or a network event is received by the Service Orchestration Function which requires a particular service composition, i.e., execution of a corresponding service chaining application.

In step 104 said corresponding service chaining application is identified and then optionally downloaded from an external source in subsequent step S106 (dashed box).

Then, a corresponding composition service session is set up in connection with a new service chaining application instance in step S108, and execution of the service chaining application logic starts with step S110, thus providing the requested composition service to at least one user.

As indicated by means of parallel flow paths in FIG. 3 "downstream" of step S110, a number of method steps are then performed essentially in parallel fashion:

In step S112 a totality of current instances of independent service elements are monitored. If a corresponding monitoring event is triggered in step S112—alternative (y) in step S114—then in step S116 a corresponding policy (e.g., resource sharing) is enforced, as described in detail above with reference to FIG. 2. The method can then either be continued with step S110 (continued execution of service chaining application logic), or with step S112 (continued resource monitoring). Alternatively (dashed line in the right part of FIG. 3), policy enforcement in step S116 may result in session termination, step S118, whereupon the method terminates with step S120.

Essentially in parallel with steps S112-S116, appropriate channels are monitored for user and/or network events (step S111). If a corresponding question in step S113 is answered in the negative (n) (no event detected), then the methods returns to a point downstream of step S110 (i.e., upstream of steps S111 and S112, respectively). Otherwise, if the question in step S113 is answered in the affirmative (y), in a subsequent step S115 a check is performed to determine whether or not the event is a predefined user/network event.

If the question in step S115 is answered in the affirmative (y), then a predefined action or application logic is executed in subsequent step S117. Assuming that execution of said predefined application logic in step S117 results in session termination (step S118), then the method terminates with step S120.

However, if the decision in step S115 yields a negative result (n) (the detected event being no predefined event), then in accordance with said event the method may either continue with step S110 (execution of a next step in the currently executing service chaining application), or alternatively with step S108 (invocation of a new service chaining application instance; dash-dotted line in FIG. 3). If said event requires a completely new service chaining application logic, then the method may alternately be continued with step S104 (dotted line). If said event results in session termination, then the method again terminates with steps S118, S120 (dashed line in the left part of FIG. 3).

The invention claimed is:

1. A method of providing services in a network offering a plurality of independent service elements in the form of network resources and network services, said method comprising:
   combining pluralities of said independent service elements to form respective service compositions;
   providing access to a plurality of service chaining applications, each of said service chaining applications being associated with a corresponding one of said service compositions and defining a set of events and actions associated with the events for controlling the independent service elements of the corresponding service composition;
   wherein upon triggering of a particular one of the service compositions, said method further comprises:
      identifying and executing, by a network element, a corresponding particular one of the service chaining applications to manage instances of the independent service elements in said particular service composition in accordance with received events, wherein the network element is configured to execute different ones of the service chaining applications in response to triggering of different ones of the service compositions; and
      managing, by the network element, said network resources and said network services in accordance with a totality of current instances of the independent service elements.

2. The method of claim 1, further comprising triggering said particular service composition in response to a network and/or user event.

3. The method of claim 1, further comprising downloading said particular service chaining application from a source external of said network.

4. The method of claim 1, wherein managing said network resources and said network services comprises at least one of:
   sharing the network resources and/or network services across independent service elements; and
   freeing up resources allocated to a first independent service element for use by a second independent service element.

5. The method of claim 1, further comprising managing user interaction during execution of the particular service chaining application to enable in response to a user event at least one of:
   executing a next step in the particular service chaining application;
   invoking a new service chaining application; and
   executing a predefined default application;
   ignoring said user event in case no corresponding action is defined.

6. The method of claim 1, further comprising providing a control channel for each of said network resources and network services, each of said control channels being associated with a set of events for controlling said network resources and said network services using said particular service chaining application.

7. The method of claim 1, further comprising:
   hosting a first subset of the service chaining applications at the network element; and
   downloading, by the network element, a second subset of the service chaining applications from a source external to the network element.

8. The method of claim 1, wherein executing said particular service chaining application causes performance of actions with respect to the instances of the independent service elements in said particular service composition in response to the received events, wherein the performance of the actions is according to the set of events and actions defined by said particular service chaining application.

9. The method of claim 8, wherein the performance of the actions comprises initializing, modifying, and terminating respective ones of the instances of the independent service elements in said particular service composition.

10. A method of providing services in a network offering a plurality of independent service elements in the form of network resources and network services, said method comprising:
   combining pluralities of said independent service elements to form respective service compositions;
   providing access to a plurality of service chaining applications, each of said service chaining applications being associated with a corresponding one of said service compositions and defining a set of events and actions associated with the events for controlling the independent service elements of the corresponding service composition;
   wherein upon triggering of a particular one of the service compositions, said method further comprises:
      identifying and executing, by a network element, a corresponding particular one of the service chaining applications to manage instances of the independent service elements in said particular service composition in accordance with received events, wherein the network element is configured to execute different ones of the service chaining applications in response to triggering of different ones of the service compositions;

managing, by the network element, said network resources and said network services in accordance with a totality of current instances of the independent service elements; and executing, by the network element, predefined logic in response to predefined user and/or network events, wherein the predefined logic overrides logic of the particular service chaining application.

11. A network element for use in a network as a gateway between a plurality of service chaining applications and network resources and network services, wherein each of the plurality of service chaining applications is associated with a corresponding service composition linking a plurality of independent service elements in the form of the network resources and network services, and defines a set of events and actions associated with the events for controlling the independent service elements of the corresponding service composition;

said network element comprising:

a computer;

an event handler executable in the computer to detect events on a number of channels, and to detect triggering of a particular one of the service compositions;

an execution engine executable in the computer to execute a particular one of the service chaining applications corresponding to said particular service composition to manage instances of the independent service elements in said particular service composition in accordance with received events, wherein the network element is configured to execute different ones of the service chaining applications in response to triggering of different ones of the service compositions.

12. The network element of claim 11, wherein the network element is configured to further:

host a first subset of the service chaining applications at the network element; and download, by the network element, a second subset of the service chaining applications from a source external to the network element.

13. The network element of claim 11, wherein execution of said particular service chaining application causes performance of actions with respect to the instances of the independent service elements in said particular service composition in response to the received events, wherein the performance of the actions is according to the set of events and actions defined by said particular service chaining application.

14. The network element of claim 13, wherein the performance of the actions comprises initializing, modifying, and terminating respective ones of the instances of the independent service elements in said particular service composition.

15. The network element of claim 11, further comprising monitoring logic executable in the computer to monitor a totality of current instances of independent service elements, wherein the network element is configured to manage said network resources and said network services in accordance with said totality of current instances of independent service elements.

16. A non-transitory computer-readable storage medium comprising program code sequences that upon execution by a computer implements a network function serving as a gateway between a plurality of service chaining applications and network resources and network services, wherein each of the plurality of service chaining applications is associated with a corresponding service composition comprising a plurality of independent service elements in the form of the network resources and network services, and defines a set of events and actions associated with the events for controlling the independent service elements of the corresponding service composition;

said program code sequences upon execution cause the computer to:

detect events on a number of channels;

detect triggering of a particular one of the service compositions;

identify and execute a particular one of the service chaining applications corresponding to said particular service composition to manage instances of the independent service elements in said particular service composition in accordance with received events, wherein the network function is configured to execute different ones of the service chaining applications in response to triggering of different ones of the service compositions.

17. The non-transitory computer-readable storage medium of claim 16, wherein the program code sequences upon execution cause the computer to further:

host a first subset of the service chaining applications at the network element; and download, by the network element, a second subset of the service chaining applications from a source external to the network element.

18. The non-transitory computer-readable storage medium of claim 16, wherein execution of said particular service chaining application causes performance of actions with respect to the instances of the independent service elements in said particular service composition in response to the received events, wherein the performance of the actions is according to the set of events and actions defined by said particular service chaining application.

19. The non-transitory computer-readable storage medium of claim 18, wherein the performance of the actions comprises initializing, modifying, and terminating respective ones of the instances of the independent service elements in said particular service composition.

20. The non-transitory computer-readable storage medium of claim 16, wherein the program code sequences upon execution cause the computer to further:

monitor a totality of current instances of independent service elements; and manage said network resources and said network services in accordance with said totality of current instances of independent service elements.

* * * * *